No. 847,674. PATENTED MAR. 19, 1907.
J. H. LUBBERS.
DRAWING GLASS ARTICLES.
APPLICATION FILED APR. 12, 1905. RENEWED JUNE 25, 1906.

2 SHEETS—SHEET 1.

WITNESSES
R. A. Balderson.
Warren W. Swartz

INVENTOR
John H. Lubbers
by Bakewell & Byrnes
his Attorneys

No. 847,674. PATENTED MAR. 19, 1907.
J. H. LUBBERS.
DRAWING GLASS ARTICLES.
APPLICATION FILED APR. 12, 1905. RENEWED JUNE 25, 1906.

2 SHEETS—SHEET 2.

WITNESSES
R. A. Balderson
Warren W. Swartz

INVENTOR
John H. Lubbers
by Bakewell Byrnes
his Attorneys

UNITED STATES PATENT OFFICE.

JOHN H. LUBBERS, OF ALLEGHENY, PENNSYLVANIA, ASSIGNOR TO WINDOW GLASS MACHINE COMPANY, OF PITTSBURG, PENNSYLVANIA, A CORPORATION OF NEW JERSEY.

DRAWING GLASS ARTICLES.

No. 847,674.     Specification of Letters Patent.     Patented March 19, 1907.

Application filed April 12, 1905. Renewed June 25, 1906. Serial No. 323,349.

*To all whom it may concern:*

Be it known that I, JOHN H. LUBBERS, of Allegheny city, Allegheny county, Pennsylvania, have invented a new and useful Improvement in Drawing Glass Articles, of which the following is a full, clear, and exact description, reference being had to the accompanying drawings, forming part of this specification, in which—

Figure 1:
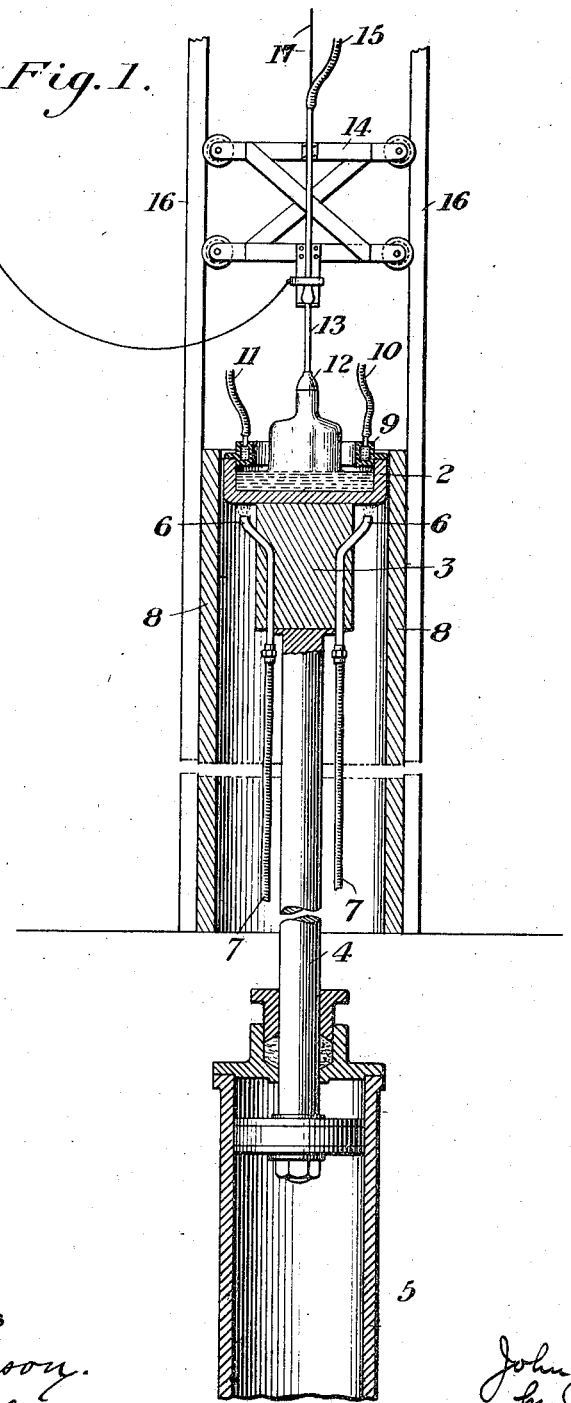
Figure 2:
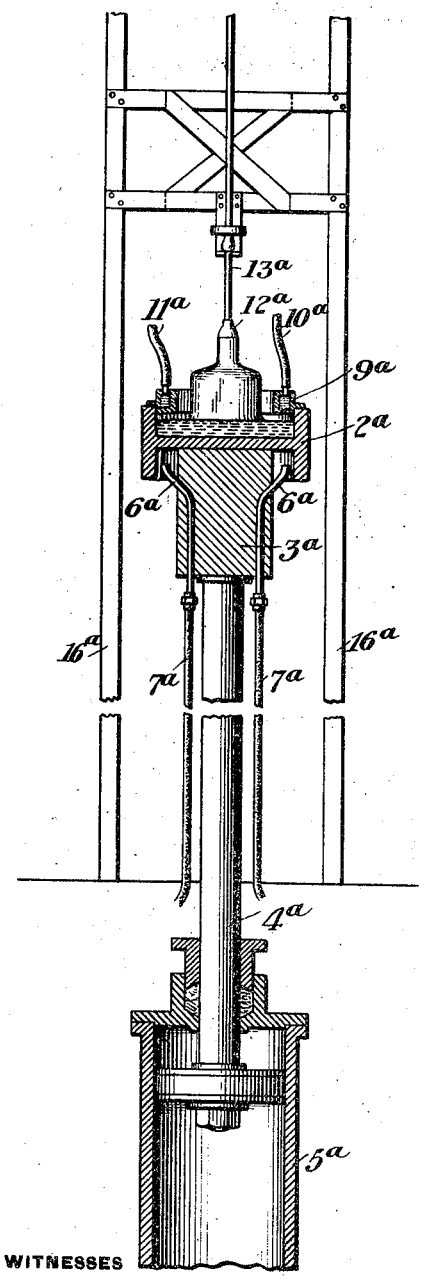
Figure 3:
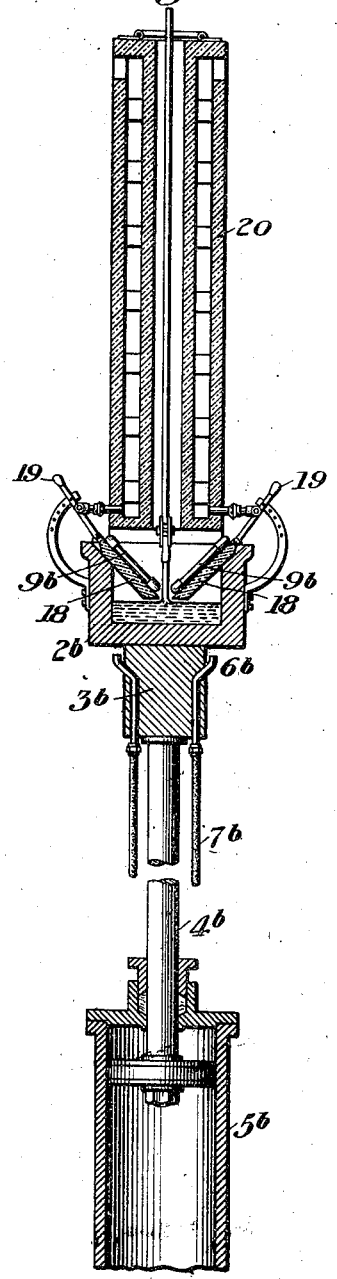

Figure 1 is a sectional side elevation showing one form of apparatus for drawing glass cylinders in accordance with my invention, and Figs. 2 and 3 are similar views showing other forms of apparatus.

My invention relates to the drawing of glass articles from a bath of molten glass. Heretofore in carrying out such operations the receptacle containing molten glass has remained stationary during the drawing operation, the glass being drawn from the bath by moving the bait relatively to the receptacle.

My invention consists in moving the receptacle away from the bait during the drawing operation. The bait may or may not be moved during the movement of the receptacle, and I may move the bait-support either during the drawing operation or after.

My invention also consists in certain other novel steps and features, all substantially as hereinafter described and claimed.

In the drawings, referring to the form of Fig. 1, 2 represents a glass-pot carried on a refractory block 3. This block is supported upon the upper end of the plunger or piston-rod 4 of a cylinder 5, which may be a hydraulic, pneumatic, or other desirable form of motive cylinder. 6 6 represents gas-burners, which may be carried in the block 3 and may be supplied with a mixture of air and gas through the flexible pipes 7. In order to retain the heat and protect the article during drawing, I may employ a vertically-extending shaft or inclosure 8, which may be of refractory material and of a shape corresponding to the outline of the pot.

9 represents a water-cooled ring resting upon the pot and having inlet and outlet pipes 10 and 11 for cooling fluid.

12 represents the bait, having a stem 13 removably clamped to a drawing-frame 14, the hollow stem 13 receiving air through a pipe 15. The movable frame 14 is guided upon uprights 16 and may be raised or lowered by flexible connections, (indicated at 17.) In carrying out the operation the pot is supplied with molten glass when in its upper position, the chilling-ring may be put in position, if such is used, the bait is brought in engagement with the glass either by raising the pot or lowering the bait, and the pot is then gradually lowered to draw the glass. The supply of air may be controlled in any desirable manner, and the frame carrying the bait may be moved upwardly at the same time that the pot is lowered, if desired. If the bait remains stationary during the drawing, the article (in this case a cylinder) will be drawn within the casing or inclosure. The article when drawn may be lifted out or removed in any desirable manner.

In Fig. 2 I show a form similar to that of Fig. 1, except that the inclosure for the pot is not employed and the pot $2^a$ is of double form, having an upper and lower cavity for receiving the glass. The pot may thus be reversed in succeeding drawing operations. In this figure parts similar to those of Fig. 1 are designated by similar numerals with the letter "a" applied.

In Fig. 3 I show a form of the invention arranged for drawing sheets or plates of glass. In this form $9^b$ $9^b$ represent water-cooled pipes extending over tilting shields 18, which may be moved by hand-levers 19. 20 indicates a drawing-chamber having hollow heated walls, within which drawing-chamber the sheet may be drawn if the said chamber is lowered with the pot. In this figure parts similar to Fig. 1 are indicated by similar numerals with the letter "b" applied.

The advantages of my invention result from the lowering or moving of the glass receptacle away from the bait during the drawing operation. If the bait is not moved, its connections may be stationary, thus doing away with the movable supply connections.

There has been considerable practical difficulty in properly regulating the speed of the motor which moves the bait in the operation of glass drawing as heretofore practiced for the reason that as the length of the article being drawn increases the weight upon the bait and the consequent load upon the motor also rapidly increases. By holding the bait stationary this difficulty is entirely overcome, inasmuch as the change in the weight of the bath is relatively very slight during the drawing operation, owing to the considerable weight of the glass-receptacle, and the load on the motor is therefore practically constant, so that its speed can be readily and accurately controlled. Even if both the bait and bath be moved during the drawing operation, this advantage is retained either wholly or in part, since the speed regulation may be applied to the movement of the bath alone, or if applied to both the bath and bait the bait has a much shorter distance to travel in drawing an article of given length.

The bait may be moved during or after the drawing operation; the chilling device may or may not be used, as desired; other forms of motors or connections may be used for lowering the receptacle, and many other changes may be made in the different parts of the apparatus without departing from my invention, since I consider myself the first to move the body of glass away from the bait during the drawing operation.

I claim—

1. The method of drawing glass articles, consisting in engaging the bait with glass in a receptacle and then moving the receptacle away from the bait; substantially as described.

2. The method of drawing glass articles, consisting in engaging a bait with a body of molten glass and then lowering the body of molten glass away from the bait; substantially as described.

3. The method of drawing glass articles, consisting in engaging the bait with a body of molten glass and then simultaneously moving the bait and the body of glass during the drawing operation; substantially as described.

4. The method of drawing glass articles, consisting in engaging a mass of molten glass, moving the mass of glass to draw the article, and inclosing said article at least partially during the drawing operation; substantially as described.

5. The method of drawing glass, consisting in engaging a bait with a mass of molten glass, moving the glass away from the bait during the drawing operation and heating the mass of glass during the drawing; substantially as described.

6. The method of drawing hollow glass articles, consisting in moving a mass of glass away from a bait engaged therewith and supplying air to the interior of the article during the drawing; substantially as described.

7. In glass-drawing apparatus, a glass-receptacle and mechanism for moving said receptacle away from the bait during the drawing operation; substantially as described.

8. In glass-drawing apparatus, a bait, a glass-receptacle beneath the same and means for lowering the receptacle during the drawing operation; substantially as described.

9. In glass-drawing apparatus, a bait, a glass-receptacle, means for moving the bait away from the receptacle, and means for moving the receptacle toward and away from the bait during the drawing operation; substantially as described.

10. The method of drawing hollow glass articles, which consists in moving a mass of glass away from a bait engaged therewith, supplying air to the interior of the article during the drawing, and controlling the air-supply; substantially as described.

11. The method of drawing glass articles, consisting in engaging the bait with glass in a receptacle, moving the receptacle away from the bait, and regulating the rate of such movement; substantially as described.

12. The method of drawing glass articles, consisting in engaging the bait with a body of molten glass, and independently moving the bait and the body of glass; substantially as described.

13. In glass-drawing apparatus, a bait, a glass-receptacle, means for moving the bait away from the receptacle, and means for independently moving the receptacle toward and away from the bait during the drawing operation; substantially as described.

14. In glass-drawing apparatus, a glass-receptacle, mechanism for moving the said receptacle away from the bait during the drawing operation, and means for supplying heat to the receptacle; substantially as described.

15. In glass-drawing apparatus, a glass-receptacle, mechanism for moving said receptacle away from the bait during the drawing operation, and means movable with the receptacle for supplying heat thereto; substantially as described.

In testimony whereof I have hereunto set my hand.

JOHN H. LUBBERS.

Witnesses:
J. A. BOLARD,
C. D. GRENO.